United States Patent [19]

Tsurumiya

[11] Patent Number: 4,943,758
[45] Date of Patent: Jul. 24, 1990

[54] STEERING CONTROL APPARATUS FOR A MOTOR VEHICLE WITH STEERABLE FRONT AND REAR WHEELS

[75] Inventor: Osamu Tsurumiya, Tochigi, Japan

[73] Assignee: Honda Giken Kogyo Kabushiki Kaisha, Tokyo, Japan

[21] Appl. No.: 246,412

[22] Filed: Sep. 19, 1988

[30] Foreign Application Priority Data

Sep. 17, 1987 [JP] Japan .................. 62-232969

[51] Int. Cl.$^5$ .................. H02P 7/14; B62D 5/04
[52] U.S. Cl. .................. 318/504; 318/2; 318/479; 318/489; 180/142
[58] Field of Search .................. 318/1, 2, 479, 488, 318/489, 504, 587, 599, 635, 675; 180/140, 142

[56] References Cited

U.S. PATENT DOCUMENTS 4,412,594 11/1983 Furukawa et al. .
4,598,788 7/1986 Serizawa et al. .
4,756,375 7/1988 Ishikura et al. .................. 318/489 X

FOREIGN PATENT DOCUMENTS 59-177611 10/1984 Japan .................. 318/587
60-67272 4/1985 Japan .
60-146304 8/1985 Japan .................. 318/587

63-103763 5/1988 Japan .

Primary Examiner—Bentsu Ro
Attorney, Agent, or Firm—Irving M. Weiner; Joseph P. Carrier; Pamela S. Burt

[57] ABSTRACT

A steering control apparatus for a motor vehicle with steerable front and rear road wheels keeps electric power supplied to an electric motor for turning the rear road wheels, at a desired value even when the voltage of a vehicle-mounted battery for energizing the motor fluctuates. The steering control apparatus includes a battery mounted on the motor vehicle, an electric motor energizable by electric power supplied from the battery for applying power output to at least a steering mechanism for turning the rear road wheels, detecting means for detecting the voltage of the battery, and a motor control unit for controlling operation of the electric motor. The motor control unit includes determining means for determining a control signal for the electric motor, correcting means for correcting the control signal with a battery voltage detected by the detecting means, and driver means for energizing the electric motor by supplying the electric motor with the electric power from the battery based on the corrected control signal.

7 Claims, 6 Drawing Sheets

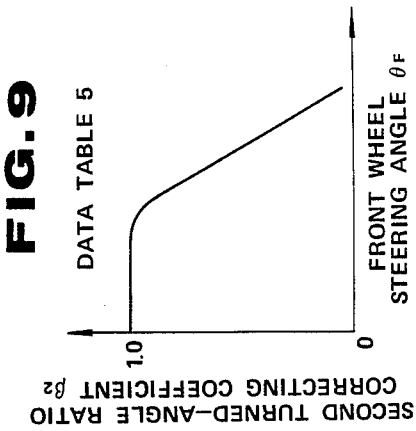
FIG.5 DATA TABLE 1
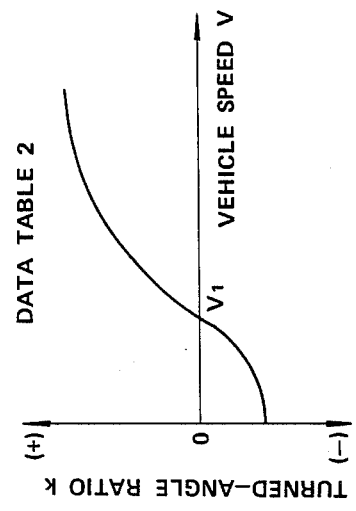
FIG.6 DATA TABLE 2
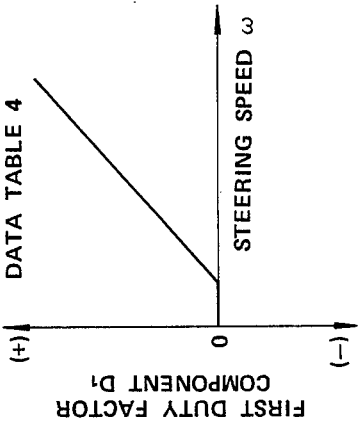
FIG.7 DATA TABLE 3
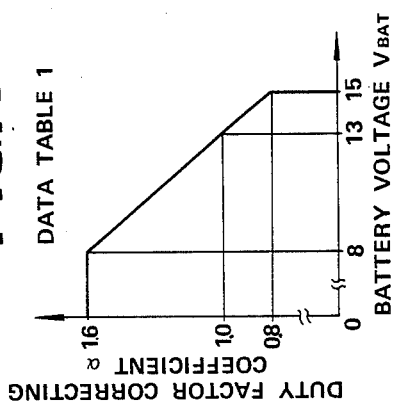
FIG.8 DATA TABLE 4
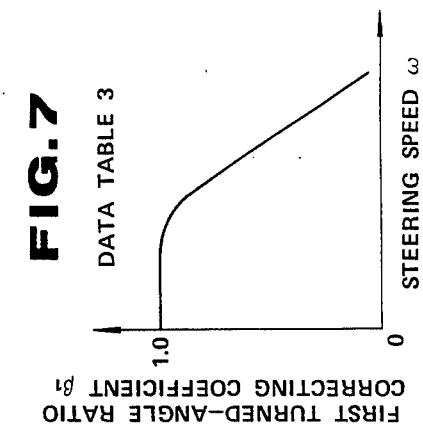
FIG.9 DATA TABLE 5

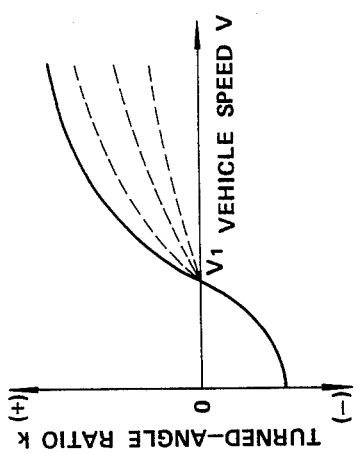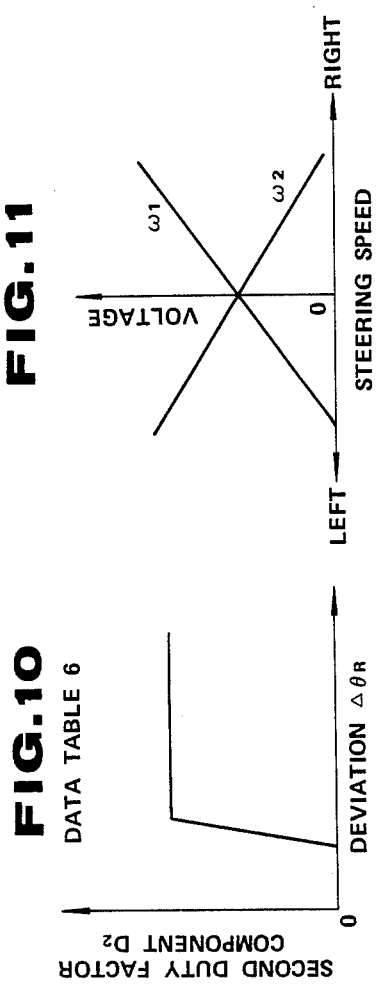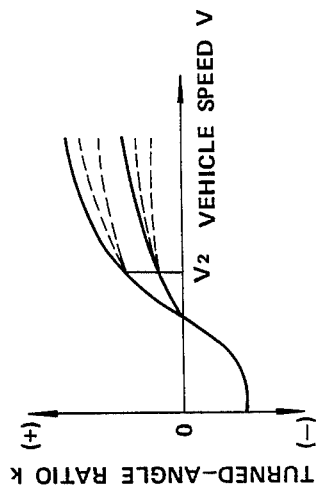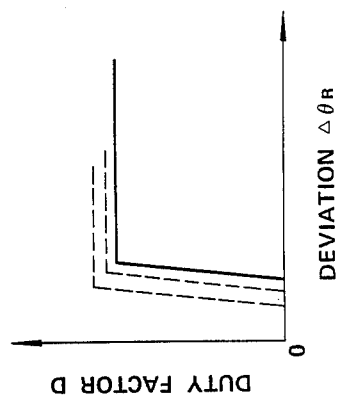

STEERING CONTROL APPARATUS FOR A MOTOR VEHICLE WITH STEERABLE FRONT AND REAR WHEELS

BACKGROUND OF THE INVENTION

1. Field of the Invention:

The present invention relates to a steering control apparatus for a motor vehicle having steerable front and rear road wheels, and more particularly to a steering control apparatus for a motor vehicle in which rear road wheels can be turned by an electric motor energized by a vehicle-mounted battery in response to the steering action of front road wheels.

2. Description of the Relevant Art:

There are known motor vehicles in which both front and rear road wheels are steerable. In some of such motor vehicles, the direction and angle of turning movement of the rear road wheels with respect to the front road wheels are controlled dependent on the speed of travel of the motor vehicle for improved steering performance. Japanese Laid-Open Patent Publication No. 63-103763 (corresponding to U.S. Ser. No. 109,232) discloses a steering apparatus for a motor vehicle with steerable front and rear road wheels, the steering apparatus including a rear wheel steering mechanism actuatable by an electric motor for turning the rear road wheels.

In the disclosed steering apparatus, the power output from the electric motor is transmitted through a ball-and-screw mechanism to the rear wheel steering mechanism. Since the electric motor is energized by a vehicle-mounted battery, the electric power supplied to the electric motor tends to vary due to a fluctuation in the voltage of the battery. Therefore, the speed at which the rear road wheels are turned is varied as the battery voltage fluctuates, giving the driver of the motor vehicle a bad steering feeling.

SUMMARY OF THE INVENTION

It is an object of the present invention to provide a steering control apparatus in which an electric motor for actuating a wheel steering mechanism can be supplied with desired electric power commensurate with power output which the electric motor is to generate, irrespective of fluctuations in the voltage of a battery for energizing the electric motor.

According to the present invention, there is provided a steering control apparatus for a motor vehicle with steerable front and rear road wheels, comprising a steering mechanism for turning the rear road wheels as well as the front road wheels in response to the turning of a steering wheel, a battery mounted on the motor vehicle, an electric motor energizable by electric power supplied from the battery for applying power output to the steering mechanism, detecting means for detecting the voltage of the battery, and a motor control unit for controlling operation of the electric motor. The motor control unit comprises determining means for determining a control signal for the electric motor, correcting means for correcting the control signal with a battery voltage detected by the detecting means, and driver means for energizing the electric motor by supplying the electric motor with the electric power from the battery based on the corrected control signal.

With the steering control apparatus of the present invention, a fluctuation or change in the battery voltage is detected, and the current supplied to energize the electric motor is corrected on the basis of the detected battery voltage fluctuation. Therefore, even when the battery voltage fluctuates, the electric power supplied to the electric motor is kept at a desired level. Consequently, the speed at which the rear road wheels are turned is less susceptible to fluctuations in the battery voltage, so that the driver is given to a good steering feeling.

The above and other objects, features and advantages of the present invention will become more apparent from the following description when taken in conjunction with the accompanying drawings in which a preferred embodiment of the present invention is shown by way of illustrative example.

BRIEF DESCRIPTION THE DRAWINGS

FIGS. 5 through 10 are graphs showing data tables employed in the control sequence shown in FIGS. 4a and 4b;

FIG. 11 is a graph showing the characteristics of signals from a steering speed sensor;

FIGS. 12 and 14 are graphs illustrating how the turned-angle ratio varies with respect to the vehicle speed; and FIG. 13 is a graph showing how a steering force varies with respect to a deviation.

DETAILED DESCRIPTION OF THE PREFERRED EMBODIMENT

Figure 1:
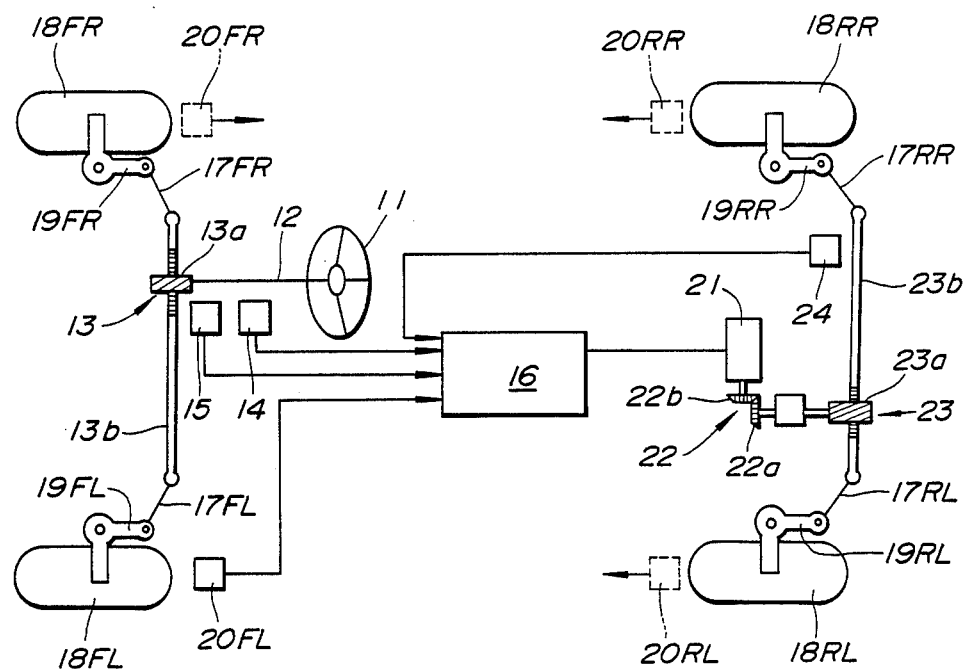
FIG. 1 is a schematic plan diagram of a steering control apparatus according to an embodiment of the present invention.

As shown in FIG. 1, a motor vehicle has a steering wheel 11 operatively coupled to a rack-and-pinion front wheel steering gear mechanism 13 through a steering shaft 12. A front wheel turned-angle sensor 14 for detecting the angle of rotation of the steering shaft 12 is disposed near the steering shaft 12. The steering angle sensor 14 comprises an encoder or the like for issuing a signal indicative of the angle through which the front wheels are turned to an electric motor control unit 16. A steering speed sensor 15 which is disposed near the steering shaft 12 comprises a tachometer generator or the like for issuing a signal indicative of the angular velocity of steering shaft 12, or a steering speed, to the motor control unit 16.

The front wheel steering mechanism 13 comprises a pinion 13a rotatable with the steering shaft 12, and a rack shaft 13b extending transversely of the motor vehicle and having a rack meshing with the pinion 13a. The rack shaft 13b has opposite ends operatively connected through linkages such as tie rods 17FL, 17FR to respective knuckle arms 19FL, 19FR on which front road wheels 18FL, 18FR are rotatably supported. Vehicle speed sensors 20FL, 20FR are disposed near the front road wheels 18FL, 18FR for detecting the speeds of rotation thereof and applying signals indicative of the speed of travel of the motor vehicle to the motor control unit 16. Likewise, vehicle speed sensors 20RL, 20RR are disposed near rear wheels 18RL, 18RR, respectively, for detecting the speeds of rotation thereof and applying signals indicative of the speed of travel of the motor vehicle to the motor control unit 16. The turned-angle sensor 14 may be replaced with other appropriate sensors, such as a sensor for detecting the distance by which the rack shaft 13b is axially moved or a sensor for directly detecting the angle through which the front road wheels 18FL, 18FR are turned. The steering speed sensor 15 may also be replaced with other appropriate sensors, such as a sensor for detecting the speed of movement of the rack shaft 13b or of a steering linkage.

An electric motor 21 is controlled by the motor control unit 16 and has an output shaft operatively coupled via a bevel gear mechanism 22 to a rack-and-pinion rear wheel steering gear mechanism 23. The bevel gear mechanism 22 comprises a bevel gear 22b fixedly mounted on the output shaft of the motor 21 and a bevel gear 22a rotatable with a pinion 23a of the rear wheel steering gear mechanism 23. The rear wheel steering gear mechanism 23 has the pinion 23a which is coupled to the motor 21 through the bevel gear mechanism 22 and a rack shaft 23b having a rack meshing with the pinion 23a. The rack shaft 23b has opposite ends operatively coupled through linkages such as tie rods 17RL, 17RR to respective knuckle arms 19RL, 19RR on which the rear road wheels 18RL, 18R are rotatably supported.

The rack shaft 23b is associated with a rear wheel turned-angle sensor 24 for detecting the distance by which the rack 23b is axially moved. The rear wheel turned-angle sensor 24 comprises a differential transformer or the like for applying a signal indicative of the angle through which the rear road wheels 18RL, 18RR are turned to the motor control unit 16. The differential transformer of the rear wheel turning angle sensor 24 has a primary coil to which an AC pulsed signal from the motor control unit 16 is applied, and a secondary coil for issuing a differential signal in response to displacement of the transformer's core with the rack shaft 23b.

In the illustrated embodiment the power output from the motor 21 is applied only to a rear wheel turning mechanism However, the present invention is also applicable to a steering control apparatus in which the power output of the motor 21 is applied to both a front wheel turning mechanism and a rear wheel turning mechanism, and a turned-angle function generating mechanism is disposed between the front and rear wheel turning mechanisms for adjusting the ratio of angles through which the front and rear wheels are turned.

Figure 3:
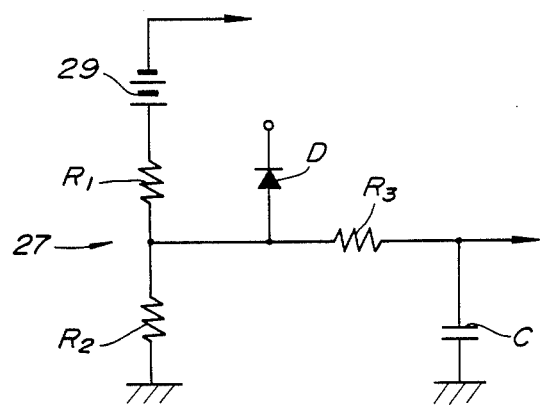
FIG. 3 is a circuit diagram of a voltage sensor.
Figure 2:
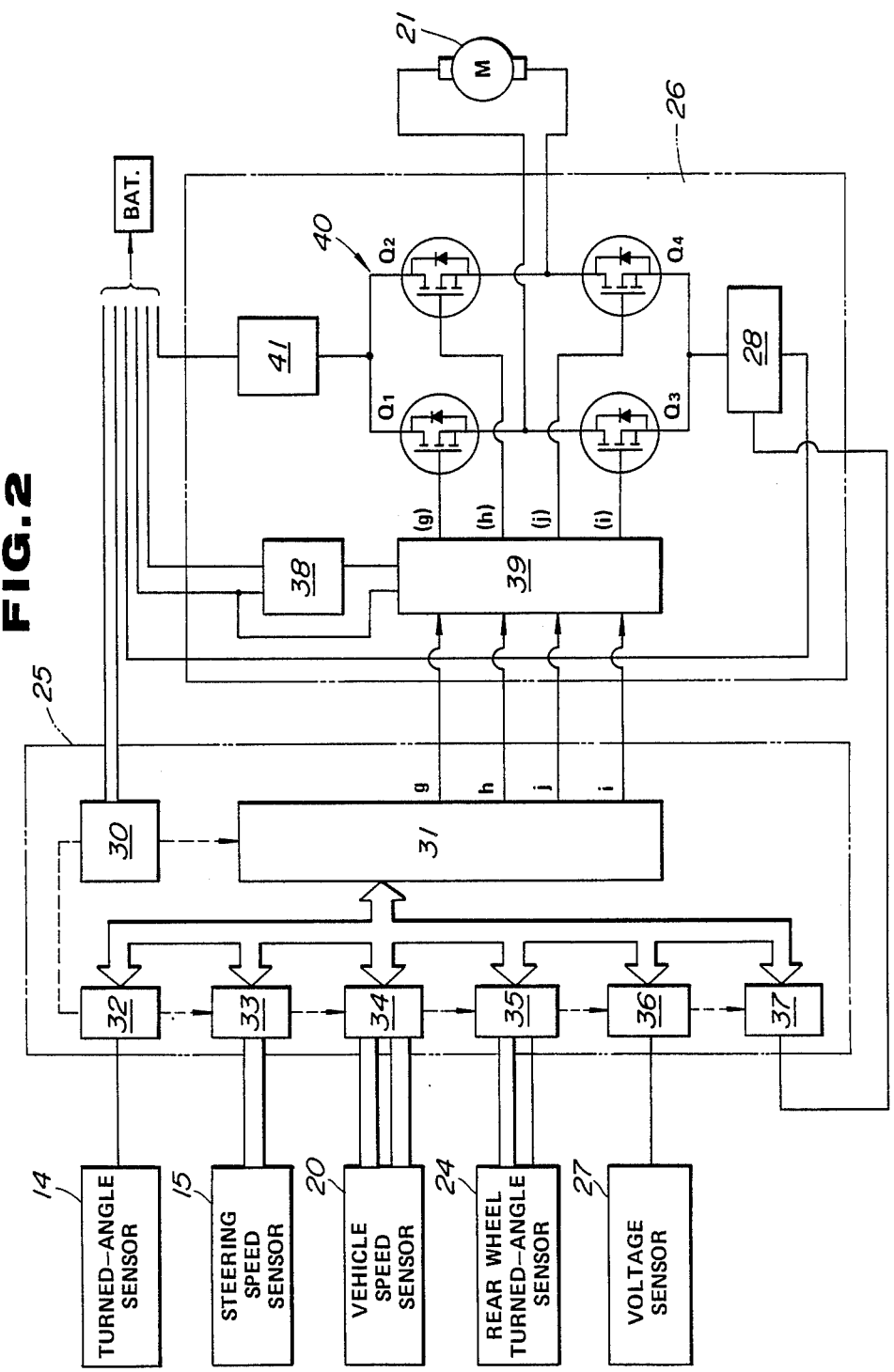
FIG. 2 is a block diagram of a motor control unit in the steering control apparatus shown in FIG. 1.

As illustrated in FIG. 2, the motor control unit 16 comprises a control circuit 25 and a driver circuit 26. The sensors 14, 15, 20FR, 20FL, 20RL, 20RR, 24, and a voltage sensor 27 are electrically connected to the control circuit 25. The driver circuit 26 includes a current sensor 28 which is also electrically connected to the control circuit 25. The driver circuit 26 is electrically connected to the motor 21. As shown in FIG. 3, the voltage sensor 27 includes voltage-dividing resistors R1, R2 connected between a battery 29 and ground. A voltage from the battery 29 as divided by the resistors R1, R2 is applied to an output terminal after voltage fluctuations have been removed by a resistor R3 and a capacitor C. The voltage sensor 27 thus serves to produce an output signal which is proportional to the voltage of the battery 29 by lowering the voltage of the battery 29 at a prescribed ratio. Denoted at D is a diode.

The control circuit 25 includes a constant-voltage power supply circuit 30, a microcomputer 31, and input interfaces 32, 33, 34, 35, 36, 37. The constant-voltage power supply circuit 30 is connected to the battery 29 through a fuse (not shown) for supplying constant-voltage electric power to the circuit components of the control circuit 25. The sensors 14, 15, 20FL, 20FR, 20RL, 20RR, 24, 27 are connected to the input interfaces 32, 33, 34, 35, 36, 37, which are connected to the microcomputer 31 by a data bus.

The input interface 32 connected to the front wheel turned-angle sensor 14 processes an output signal produced thereby to apply a signal representing the turned angle and direction of the front road wheels 18FL, 18FR to the microcomputer 31. The input interface 33 connected to the steering speed sensor 15 applies a signal indicative of the magnitude and direction of the steering speed to the microcomputer 31. The input interface 35 connected to the rear wheel turned-angle sensor 24 comprises an oscillator, a rectifier, and a low-pass filter for applying an AC pulse signal to the primary coil of the differential transformer of the rear wheel turned-angle sensor 24 and for shaping a signal from the secondary coil of the differential transformer into a signal which is applied to the microcomputer 31. The input interface 34 coupled to the vehicle speed sensors 20FL, 20FR, 20RL, 20RR comprises a waveform shaper and an arithmetic circuit for applying a vehicle speed signal based on output signals from the vehicle speed sensors 20FL, 20FR, 20RL, 20RR to the microcomputer 31. The input interface 36 coupled to the voltage sensor 27 has an A/D converter for issuing a signal representative of the voltage of the battery 29. The input interface 37 joined to the current sensor 28 has an amplifier and an A/D converter for converting an output signal from the current sensor 28 into a digital signal and applying the digital signal to the microcomputer 31.

The microcomputer 31 comprises a CPU, a ROM, a RAM, and a clock. According to a program stored in the ROM, the microcomputer 31 processes the signals applied from the sensors via the input interfaces 32, 33, 34, 35, 36 to determine the duty factor of a current to be supplied to the motor 21, and applies pulse-width-modulated signals (PWM signals) g, h, i, j indicative of the determined duty factor to the driver circuit 26.

The driver circuit 26 comprises a booster 38, a gate driver 39, the current sensor 28, a relay circuit 41, and a switching circuit 40. The gate driver 39 is connected to the battery, and the switch circuit 40 is connected to the battery 29 through the relay circuit 41. The switch circuit 40 comprises a bridge of four field-effect transistors (FETs) Q1, Q2, Q3, Q4 with their gates joined to the gate driver 39. The FETs Q1, Q2 have their drains connected to the battery 29 and their sources connected to the drains of the FETs Q3, Q4, which have sources connected to ground (i.e., one terminal of the battery 29) through the current sensor 28. The motor 21 is connected between the junction of the source of the FET Q1 and the drain of the FET Q3 and the junction of the source of the FET Q2 and the drain of the FET Q4. The booster 38 increases the voltage of the battery 29 and applies the increased voltage to the gate driver 39. The gate driver 39 applies drive signals to the gates of the FETs Q1, Q2, Q3, Q4 based on the PWM signals g, h, i, j from the microcomputer 31. The current sensor 28 detects a current flowing through the motor 21 and applies a current signal to the input interface 37. In the switching circuit 40, the gate of the FET Q1 is supplied with a drive signal of the duty factor corresponding to the PWM signal g, the gate of the FET Q2 is supplied with a drive signal of the duty factor corresponding to the PWM signal h, the gate of the FET Q3 is supplied with a drive signal of the duty factor corresponding to the PWM signal i, and the gate of the FET Q4 is supplied with a drive signal of the duty factor corresponding to the PWM signal j.

A control sequence of the motor control unit 16 for controlling the motor 21 will be described in detail with reference to FIGS. 4a and 4b.

Figure 4A:
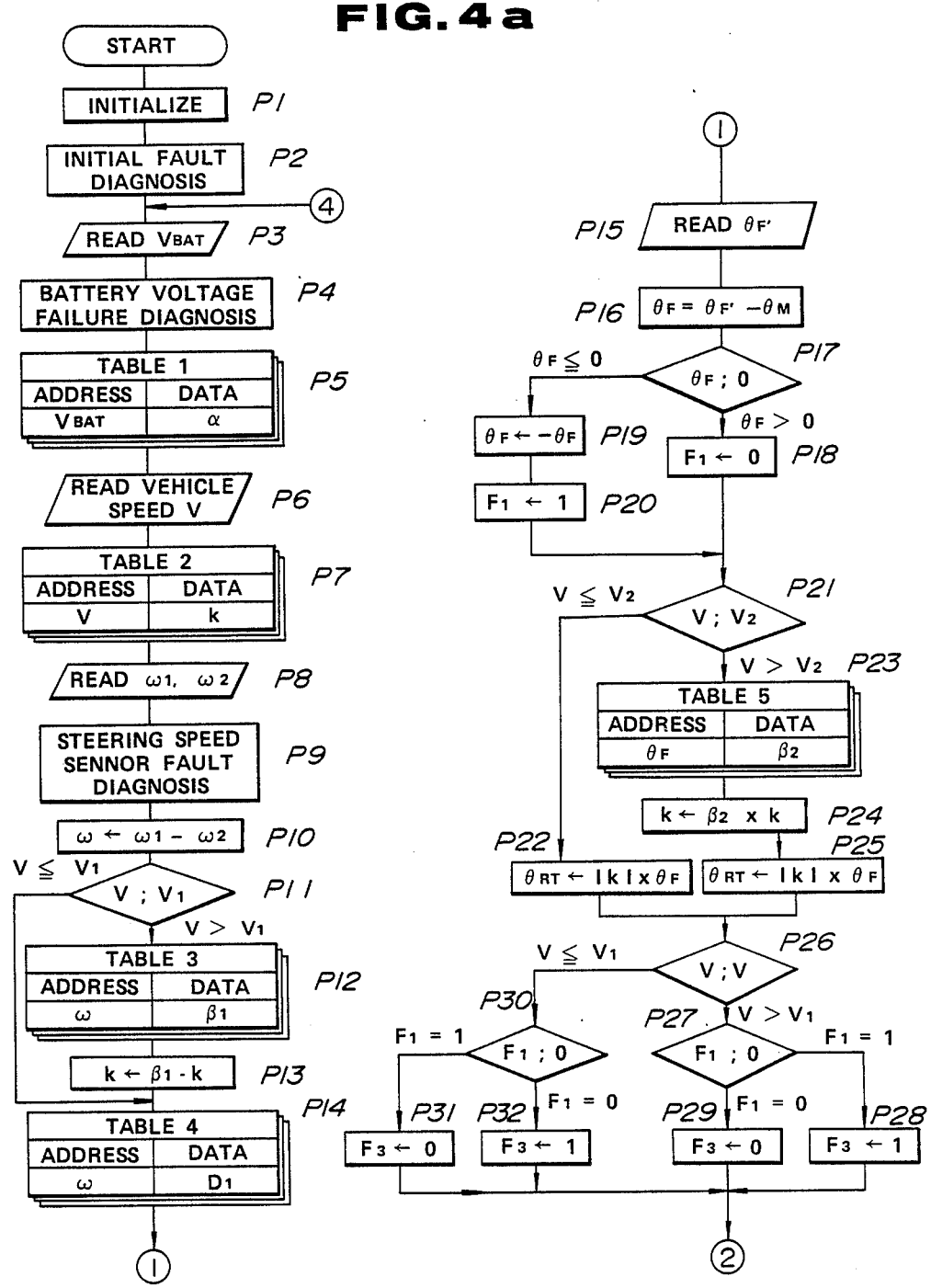
FIGS. 4a and 4b are a flowchart of a control sequence of the steering control apparatus shown in FIG. 1.
Figure 4B:
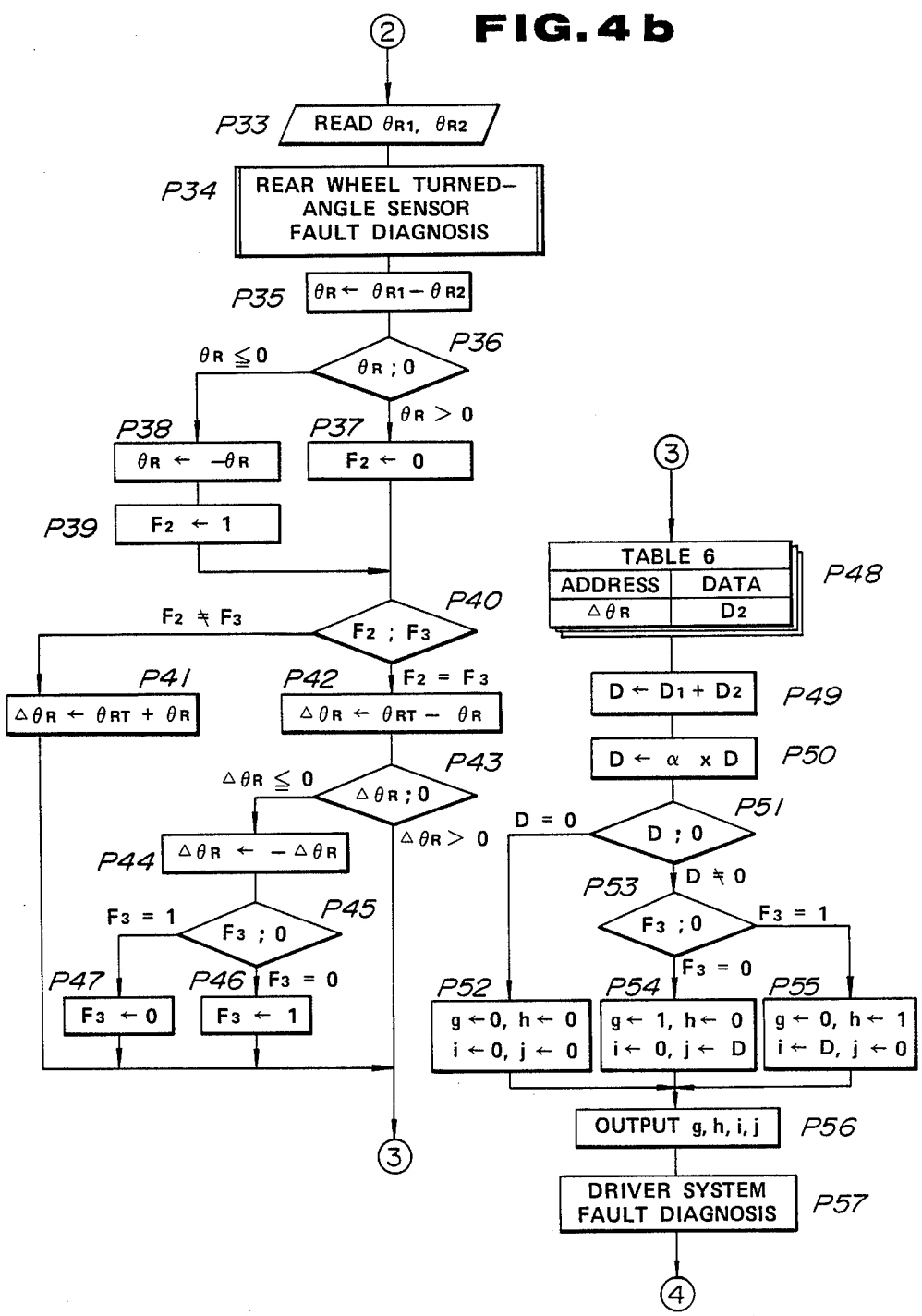

The motor control unit 16 executes the control sequence shown in the flowchart of FIGS. 4a and 4b for controlling the motor 21.

When an ignition key (not shown) is operated to turn on a key switch (not shown) of the motor vehicle, the microcomputer 31 and other circuits are energized to start controlling the motor 21. The microcomputer 31 is initialized in a step P1 to erase data stored in an internal register and address the same. Then, a step P2 executes initial fault diagnosis according to a subroutine, and control goes to the following processing only if all components of the control apparatus function properly.

A voltage $V_{BAT}$ of the battery 29 is read from the output signal of the voltage sensor 27 in a step P3, which is followed by a step P4 that executes battery voltage failure diagnosis according to a subroutine. More specifically, the step P4 determines whether the voltage $V_{BAT}$ of the battery 29 falls within a prescribed range of from 8 volts to 15 volts, for example, or not. Control goes to the subsequent processing only if the battery $V_{BAT}$ of the battery 29 falls within the allowable range. Then, a step P5 searches a table table or map 1 shown in FIG. 5 for a corrective coefficient $\alpha$ for the duty factor while employing the voltage of the battery 29 as an address. As shown in FIG. 5, the corrective coefficient $\alpha$ is reduced at a constant ratio as the voltage $V_{BAT}$ of the battery 29 increases. Thus, the corrective coefficient $\alpha$ is larger in a lower voltage range and smaller in a higher voltage range.

A vehicle speed V is read in based on the output signals from the vehicle speed sensors 20FL, 20FR, 20RL, 20RR in a step P6, which is followed by a step P7 which searches a data table or map 2 shown in FIG. 6 for a turned-angle ratio k of the rear road wheels with respect to the front road wheels. As shown in FIG. 6, the turned-angle ratio k is negative (i.e., the rear road wheels are steered in the opposite direction or phase to the front road wheels) when the motor vehicle runs in a low vehicle speed range lower than a prescribed vehicle speed V1, and is positive (i.e., the rear road wheels are steered in the same direction as or in phase with the front road wheels) when the motor vehicle runs in a high vehicle speed, speed range higher than the prescribed vehicle speed V1.

In a step P8, two output signals $\omega 1$, $\omega 2$ are read in from the steering speed sensor 15. As shown in FIG. 11, the output signals $\omega 1$, $\omega 2$ are complementary to each other in the steering direction. A next step P9 executes steering speed sensor fault diagnosis according to a subroutine, and control goes to subsequent steps only if the steering speed sensor 15 functions properly. In a step P10, a steering speed $\omega$ is calculated by subtracting the output signal $\omega 2$ from the output signal $\omega 1$ ($\omega = \omega 1 - \omega 2$). As illustrated in FIG. 11, the steering speed $\omega$ is positive when the steering wheel 11 is turned to the right or clockwise, for example, and negative when the steering wheel 11 is turned to the left or counterclockwise, for example. If the vehicle speed V is higher than the prescribed speed V1, the turned-angle ratio k is not corrected and control jumps to a step P14.

In a step P12, a data table or map 3 shown in FIG. 7 is searched for a first turned-angle ratio correcting coefficient $\beta 1$ by addressing the data table 3 with the steering speed $\omega$. In a next step P13, the turned-angle ratio k is corrected by being multiplied by the correcting coefficient $\beta 1$. Since the first turned-angle ratio correcting coefficient $\beta 1$ is higher in a lower steering speed range and progressively reduced in a higher steering speed range, the rate of change of corrected turned-angle ratio k with respect to the vehicle speed is lowered in a higher vehicle speed range dependent on the steering speed $\omega$ as indicated by broken-line curves in FIG. 12. In a step P14, a data table or map 4 shown in FIG. 8 is searched for a first duty factor component D1 that determines the magnitude of a rear wheel turning force by using the steering speed $\omega$ as an address. FIG. 8 indicates that the first duty factor component D1 had a certain dead zone with respect to a certain lower range of the steering speed $\omega$, and progressively increases at a constant ratio following the dead zone.

In a step P15, an output signal $\theta F'$ is read from the front wheel turned-angle sensor 14. Then, a neutral reference value $\theta M$ is subtracted from the output signal $\theta F'$ of the front wheel turned-angle sensor 14 to determine a front wheel turned angle $\theta F$ from the neutral steering position in a step P16. Since the front road wheels 18FL, 18FR are mechanically coupled to the steering shaft 12, the angle of rotation of the steering shaft 12 substantially corresponds to the turned angle of the front road wheels 18FL, 18FR. Therefore, the front wheel turned angle $\theta F$ is representative of the angle through which the front road wheels 18FL, 18FR are turned. A next step P17 determines whether the front wheel turned angle $\theta F$ is positive or negative, i.e., the direction in which the front road wheels are turned. If the front wheel turned angle $\theta F$ is positive, then a flat F1 is set to 0 in a step P18. If the front wheel turned angle $\theta F$ is zero or negative, then the value thereof is made positive (i.e., absolutized) in a step P19, and thereafter the flag F is set to 1 in a step P20.

A step P21 determines whether the vehicle speed V is in excess of the predetermined vehicle speed V2 or not. If the vehicle speed V is equal to or smaller than the predetermined vehicle speed V2, then control executes a step P22. If the vehicle speed V exceeds the predetermined vehicle speed V2, control executes steps P23, P24, P25. In the step P22, the front wheel turned angle $\theta F$ is multiplied by the absolute value of the turned-angle ratio k corrected in the step P13 to calculate a target turning angle $\theta RT$ for the rear wheels 18RL, 18RR. The step P23 addresses a data table or map 5 shown in FIG. 9 with the front wheel turned angle $\theta F$ to search for a second turned-angle ratio correcting coefficient $\beta 2$. In the step P24, the turned-angle ratio k corrected in the step P13 is further corrected by being multiplied by the second turned-angle ratio correcting coefficient $\beta 2$. In the step P25, the front wheel turned angle $\theta F$ is multiplied by the absolute value of the turned-angle ratio k corrected in the step P24 to calculate a target turning angle $\theta RT$ for the rear wheels 18RL, 18RR. The rate of change of the turned-angle ratio k corrected in the step P25 is further lowered in a higher vehicle speed range in excess of a predetermined vehicle speed V2 as shown in FIG. 14.

The step P26 determines if the vehicle speed V is in excess of the prescribed vehicle speed V1. If the vehicle speed V is in excess of the prescribed vehicle speed V1, then the control goes to steps P27, 28, 29, and if the vehicle speed V is equal to or lower than the prescribed vehicle speed V1, then the control executes steps P30, P31, P32. The step P27 determines the value of the flag F1. If the flag F1 is 1, then a flag F3 is set to 1 in the step P28, and if the flag F1 is 0, then the flag F3 is set to 0 in the step P29. Likewise, the step P30 determines the value of the flag F1. If the flag F1 is 1, then the flag F3 is set to 0 in the step P31, and if the flag F1 is 0, the flag F3 is set to 1 in the step P32. The flag F3 therefore indicates the direction in which the rear road wheels are to be turned in the manner to respond to the turned direction of the front road wheels.

In a next step P33, output signals $\theta R1$, $\theta R2$ are read from the rear wheel turned-angle sensor 24. A step P34 effects fault diagnosis for the rear wheel turned-angle sensor 24 according to a subroutine. Control goes to subsequent steps only if the rear wheel turned-angle sensor 24 functions properly. In a step P35, the output signals $\theta R1$, $\theta R2$ of the rear wheel turned-angle sensor 24 are subtracted one from the other to determine an actual turned angle $\theta R$ of the rear road wheels. Then, a step P36 determines whether the rear wheel turned angle $\theta R$ is positive or negative. If the rear wheel turned angle $\theta R$ is positive, then a flag F2 is set to 0 in a step P37. If the rear wheel turned angle $\theta R$ is equal to zero or negative, then the value of the rear wheel turned angle $\theta R$ is made positive in a step P38, and then the flag F2 is set to 1 in a step P39.

A step P40 compares the values of the flags F2, F3. If the values are different from each other, then control goes to a step P41, and if the the values are the same as each other, then control goes to steps P42 through P47. The step P41 adds the target rear wheel turned angle $\theta RT$ and the rear wheel turned angle $\theta R$ to obtain a deviation $\Delta\theta R$. The step P42 subtracts the rear wheel turned angle $\theta R$ from the target rear wheel turned angle $\theta RT$ to find a deviation $\Delta\theta R$. The step P43 thereafter determines whether the deviation $\Delta\theta R$ is positive or negative. If the deviation $\Delta\theta R$ is zero or negative, the deviation $\Delta\theta R$ is made positive in the step P44, and then the value of the flag F3 is replaced in the steps P45, P46, P47. More specifically, the step P45 determines the value of the flag F3. If the flag F3 is 0, then the flag F3 is replaced with 1 in the step P46, and if the flag F3 is 1, then it is replaced with 0 in the step P47.

In a step P48, a data table or map 6 shown in FIG. 10 is searched for a second duty factor component D2 by using the deviation $\Delta\theta R$ as an address. The second duty factor component D2 is zero in a lower deviation range and has a substantially constant value in a higher deviation range. The first and second duty factor components D1, D2 are added in a step P49 to calculate a duty factor D. The duty factor D varies with respect to the deviation $\Delta\theta R$, as indicated by a broken-line curve in FIG. 13. Then, the duty factor D is corrected by being multiplied by the corrective coefficient $\alpha$ in a step P50. Since the corrective coefficient $\alpha$ varies with respect to the voltage $V_{BAT}$ of the battery 29 as shown in FIG. 5, the duty factor D which will determine that the magnitude of the rear wheel turning force in a subsequent output step is reduced when the battery voltage is high. Even if the voltage of the battery 29 fluctuates, the electric power supplied to the motor 21 is maintained at a desired value, so that the effect of fluctuations in the battery voltage can be reduced. Consequently, the angle through which or the speed at which the rear wheels 18RL, 18RR are turned is not varied due to fluctuations in the voltage of the battery 29, and the driver is given an improved steering feeling.

A next step P51 determines whether the duty factor D is 0 or not. If the duty factor D is 0, then the PWM signals g, h, i, j are set to 0, 0, 0, 0, respectively, in a step P52. If the duty factor D is not 0, then a step P53 ascertains the value of the flag F3. If the flag F3 is 0, then the PWM signals g, h, i, j are set to 1, 0, 0, D, respectively, in a step P54. If the flag F3 is 1, then the PWM signals g, h, i, j are set to 0, 1, D, 0, respectively, in a step P55. Thereafter, the PWM signals g, h, i, j are issued in a step P56. Therefore, the motor 21 is energized with a duty factor D dependent on the turning direction of the rear road wheels 18RL, 18RR. When the motor 21 is not energized, the winding thereof is short-circuited for electrically braking the motor 21 to keep the rear wheel turned angle at the target turning angle. Subsequently, the driver system including the motor 21 and the switching circuit 40 is diagnosed for fault according to a subroutine in a step P57. Then, the control sequence from the step P2 is repeated.

With the steering control apparatus of the above embodiment, therefore, the electric power supplied to the motor 21 is kept at a desired value without being affected by fluctuations in the voltage of the battery 29, with the result that the turned angle of the rear wheels 18RL, 18RR can be controlled accurately at a value dependent on various conditions such as the turned angle of the front wheels 18RL, 18FR, the steering speed, the vehicle speed, etc. thus giving the driver a good steering feeling.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. A steering control apparatus for a motor vehicle with steerable front and rear road wheels, comprising:
   a steering mechanism for turning the rear road wheels as well as the front road wheels in response to the turning of a steering wheel;
   a battery mounted on the motor vehicle;
   an electric motor energizable by electric power supplied from said battery for applying power output to said steering mechanisms;
   detecting means for detecting the voltage of said battery; and
   a motor control unit for controlling operation of said electric motor, said motor control unit comprising:
   determining means for determining a control signal for said electric motor;
   correcting means for correcting said control signal with a battery voltage detected by said detecting means such that the power output of said electric motor will be maintained at a desired level despite variations in the battery voltage; and
   driver means for energizing said electric motor by supplying the electric motor with the electric power from the battery based on said corrected control signal.

2. A steering control apparatus according to claim 1, wherein said correcting means includes means for establishing a coefficient which increases as the voltage of the battery decreases for securing the power output of said electric motor.

3. A steering control apparatus according to claim 2, wherein said correcting means corrects a pulse-width-modulated signal to be fed to said driver means based on said coefficient and outputs the corrected pulse-width-modulated signal.

4. A steering control apparatus for a motor vehicle with steerable front and rear road wheels, comprising:
a steering mechanism for turning the rear road wheels as well as the front road wheels in response to the turning of a steering wheel;
a battery mounted on the motor vehicle;
an electric motor energizable by electric power supplied from said battery for applying power output to said steering mechanism;
detecting means for detecting the voltage of said battery; and
a motor control unit for controlling operation of said electric motor, said motor control unit comprising:
determining means for determining a control signal for said electric motor;
correcting means for correcting said control signal with a battery voltage detected by said detecting means; and
driver means for energizing said electric motor by supplying the electric motor with the electric power from the battery based on said corrected control signal;
said steering mechanism comprises a front wheel steering mechanism mechanically coupled to the steering wheel, and a rear wheel steering mechanism mechanically independent of said front wheel steering mechanism, the arrangement being such that the power output of said electric motor is applied only to said rear wheel steering mechanism.

5. A steering control apparatus according to claim 4, further including means for detecting the turned angle of the front road wheels, means for detecting the turning speed of the front road wheels, means for detecting the turned angle of the rear road wheels, and means for detecting the speed of the motor vehicle, said determining means including means for determining a target turning angle for the rear road wheels based on the turned angle and turning speed of the front road wheels, means for calculating a turned angle deviation of the turned angle of the rear road wheels from said target turning angle for the rear road wheels, and means for determining the control signal based on said turned angle deviation and said turning speed of the front road wheels.

6. A steering control apparatus according to claim 5, wherein said means for determining a target turning angle for the rear road wheels includes means for determining a ratio of the turned angle of the rear road wheels to the turned angle of the front road wheels based on the speed of the motor vehicle, and first correcting means for correcting said determined ratio dependent on said turning speed of the front road wheels.

7. A steering control apparatus according to claim 6, wherein said means for determining a target turning angle for the rear road wheels further includes second correcting means for correcting said determined ratio dependent on said turned angle of the front road wheels.

* * * * *

UNITED STATES PATENT AND TRADEMARK OFFICE
CERTIFICATE OF CORRECTION

PATENT NO. : 4,943,758

DATED : July 24, 1990

INVENTOR(S) : Osamu TSURUMIYA

It is certified that error appears in the above-identified patent and that said Letters Patent is hereby corrected as shown below:

```
Column 3, line 26, change "18R" to --18RR--;
          line 41, after "embodiment" insert a comma;
          line 43, after "mechanism" insert a period.
Column 4, line 8, after "27" insert --, 28--.
Column 5, line 34, delete "table" (second occurrence).
Column 7, line 35, delete "the" (second occurrence).
Column 8, line 7, change "then-the" to --then the--;
          line 32, change "18RL" to --18FL--.
```

Signed and Sealed this

Fourteenth Day of January, 1992

*Attest:*

HARRY F. MANBECK, JR.

*Attesting Officer*          *Commissioner of Patents and Trademarks*